United States Patent [19]

De Bernardi

[11] Patent Number: 4,661,186

[45] Date of Patent: Apr. 28, 1987

[54] PROCESS AND APPARATUS FOR JOINING PROTECTIVE PLASTIC FILMS TO AN EXTRUDED PLASTIC SHEET, WITH THE AID OF AN AUXILIARY PLASTIC FILM

[75] Inventor: Stefano De Bernardi, Busto Arsizio, Italy

[73] Assignee: Carbolux S.p.A., Nera Montoro, Italy

[21] Appl. No.: 791,202

[22] Filed: Oct. 24, 1985

[30] Foreign Application Priority Data

Oct. 26, 1984 [IT] Italy ............................... 23326 A/84

[51] Int. Cl.$^4$ .............................................. B32B 31/20
[52] U.S. Cl. ...................................... 156/230; 156/243; 156/244.11; 156/244.24; 156/244.27; 156/246; 156/249; 156/306.3; 156/344; 156/498; 156/499; 156/500; 156/540; 156/544
[58] Field of Search .................... 156/230, 243, 244.11, 156/244.12, 244.16, 244.22, 244.24, 244.27, 246, 249, 498, 499, 500, 344, 306.3, 584, 540

[56] References Cited

U.S. PATENT DOCUMENTS

| | | | |
|---|---|---|---|
| 3,010,861 | 11/1961 | Reese | 156/244.24 |
| 3,185,614 | 5/1965 | Van Hartesvedlt et al. | 156/321 |
| 3,230,126 | 1/1966 | Craver | 156/244.27 |
| 3,434,862 | 3/1969 | Luc | 156/234 |
| 3,594,249 | 7/1971 | Mueller-Tamm et al. | 156/244.22 |
| 3,884,749 | 5/1975 | Pankoke | 156/246 |
| 4,261,777 | 4/1981 | Vetter et al. | 156/244.27 |
| 4,462,852 | 7/1984 | Custor | 156/246 |

FOREIGN PATENT DOCUMENTS

| | | |
|---|---|---|
| 0002174 | 6/1979 | European Pat. Off. . |
| 1941830 | 2/1971 | Fed. Rep. of Germany . |
| 1704496 | 5/1971 | Fed. Rep. of Germany . |
| 2427129 | 1/1976 | Fed. Rep. of Germany . |
| 1596114 | 7/1970 | France . |
| 952742 | 3/1964 | United Kingdom . |

Primary Examiner—Caleb Weston
Attorney, Agent, or Firm—Young & Thompson

[57] ABSTRACT

A process and apparatus are described wherein a honeycombed sheet of plastic is extruded from an extruder and at least one protective film of plastic is joined onto at least one of its surface layers, the protective film having a softening temperature lower than that for extruding the sheet. The protective film, combined with the auxiliary film or support film, is laid onto the surface of the sheet leaving the extruder; then the sheet, protective film and support film are subjected to the calibrating and cooling stage; and lastly the support film is separated from the sheet. The protective film has now been made an integral part of the sheet, thereby to produce, for example, a protected honeycombed sheet.

7 Claims, 3 Drawing Figures

PROCESS AND APPARATUS FOR JOINING PROTECTIVE PLASTIC FILMS TO AN EXTRUDED PLASTIC SHEET, WITH THE AID OF AN AUXILIARY PLASTIC FILM

The subject of the present invention is a new process and apparatus for joining protective plastic films to an extruded plastic sheet, with the aid of an auxiliary plastic film.

The system of joining an external film to a solid plastic sheet, obtained by calendering, has been known for many years. In this case a film of suitable material is pressed by the first of a series of calender rollers onto the underlying plastic mass, which is fed continuously from the plastifying means P. See in this regard the arrangement shown in FIG. 1.

The joining of a film A to a solid sheet B can be used, for example, to protect the outer surface and improve the general performance thereof.

Plates obtained by direct extrusion are not solid but have a lightened structure (honeycombed with longitudinal cells of various shapes or foamed plastic), also defined as "structural", which allows the end product to be made more thermally insulating and overall resistance to bending to be increased, per unit of weight of said sheet.

It is therefore obvious that in the latter case any attempt to join on a plastic film by forcefully pressing it with a rotating roller against a honeycombed sheet, still in the plastic state, must cause the lightened structure to collapse, squashing it against the counteracting means and thereby altering the plastic sheet cross-section from a honeycombed to a solid form with a smaller total thickness.

EP-A-2174 describes a process and a device for covering a hollow extruded section of synthetic material with a thin film (or sheet), wherein said film is hot-layed onto the extruded section, thereby achieving a macromolecular-type joining together. However, the extruded section obtained in this way lacks uniformity on the surface covered by the thin film and has in particular "wrinkles" or creases due to the uneven setting of the plastic forming the film. As well as having an unesthetic look, the product does not provide a uniform protective surface.

FR-A-1,596,114 describes the use of a traction film for moving the sandwich-type combination comprising an internal sheet of polymerizable material with incorporated hollow tubular elements and two thin external films. In this apparatus the traction film forms a conveyor belt.

U.S. Pat. No. 3,434,862 describes a process for positioning decorative material in the plastic state onto a tape so as form the desired writing or pattern. This apparatus also includes an auxiliary tape whereon an embossed roller acts which distributes the decorative material evenly. In this way said decorative material is positioned in localized areas. The combination has thereby a differentiated thickness. The auxiliary tape also acts to distribute said decorative material and leaves the apparatus with some of it adhering from the treatment. Basically, the decorative material is on the areas complementary to those prearranged as decoration on the sheet. For this reason the auxiliary tape can only be used a limited number of times.

Therefore, the object of the present invention is to provide a process and apparatus for joining two or more different plastic materials into a stable form so that the resulting surface formed by joining together the film and sheet is perfectly flat and even, for the purpose of improving the general performance of sheets in thermoplastic resin, preferably of the honeycombed type obtained by extrusion.

The object is achieved by providing for the protective film, together with a support film, to be brought into contact with at least one surface of the sheet leaving the extruding means. The combination formed by the sheet and the film heated by coming into contact with said sheet at a higher temperature, is guided, pulled and held against the surface of the sheet by the auxiliary or support film. Next, said combination is subjected to the calibration and cooling stage; lastly said support film is removed from the cooled combination formed by the sheet, one of the outer surfaces of which is of a different material than the other (composite sheet).

In particular, the apparatus is provided with a sheet-extrusion die box, at least one means for bearing the combined protective film and support film, means for guiding the film to bring it into contact with the surface of the sheet to which it is to be applied, at least one cooling calibrating means and at least one bearing and guide means for rewinding the support film, after the sheet/protective film combination has left the calibrating means.

According to a preferred embodiment, before contact is made with the surface of the sheet, a device is provided for combining the protective film and the support film, said device having heating resistors and pressing means.

Particular improvements provide for a cooling screen between the extruding means and the protective film which limits the heat radiation coming from the metallic surfaces of the die box, so as to avoid early softening of the protective film.

Further particular characteristics of the process, apparatus and product according to the present invention will now be illustrated with reference to the accompanying drawings, in which.

According to this invention, the force which shall hold the two materials together, that is the sheet and the protective film, is of the macromolecular type, like that obtained by fusing one plastic material (low-melting film) onto another plastic material with a higher softening temperature (high-melting honeycombed sheet).

At present there is a provision for joining a single film to the sheet, only if the film is high-melting (that is, it passes to the plastic state at a temperature higher than that of the underlying sheet). In this case the adhesion is not reliable with time and the end product may suffer from delamination.

If the film is low-melting, the surface obtained reaches the liquid state very quickly (given the small thickness thereof) and therefore has a viscosity which is too low for the process of extrusion, and especially for that required in the calibration stage wherein the moving plastic mass slides in direct contact against a suitably temperature controlled stationary metal wall with openings through which a controlled vacuum is applied.

In other words, a "liquid" rather than a "plastic" mass sliding against the calibrating plate causes a state of excessive tackiness and agglomeration in the liquid stage, such as to give the sheet's final surface a far from even and desired appearance.

Therefore, the use of a further film is provided which acts as a guide in the "liquid" stage and which bears all the mechanical stress in such an operation, until during the normal cooling process the underlying "liquid" state has been set into a solid form, integral with the substratum of a different resin base, maintaining an even thickness and a perfectly flat interfacing surface. In this way the support film may be removed subsequently, when cold, from the combined product. Obviously this support film must have heat resistance and specific anti-adhering characteristics to enable subsequent rewinding and reuse, thus reducing its increase of direct production costs.

Figure 1:
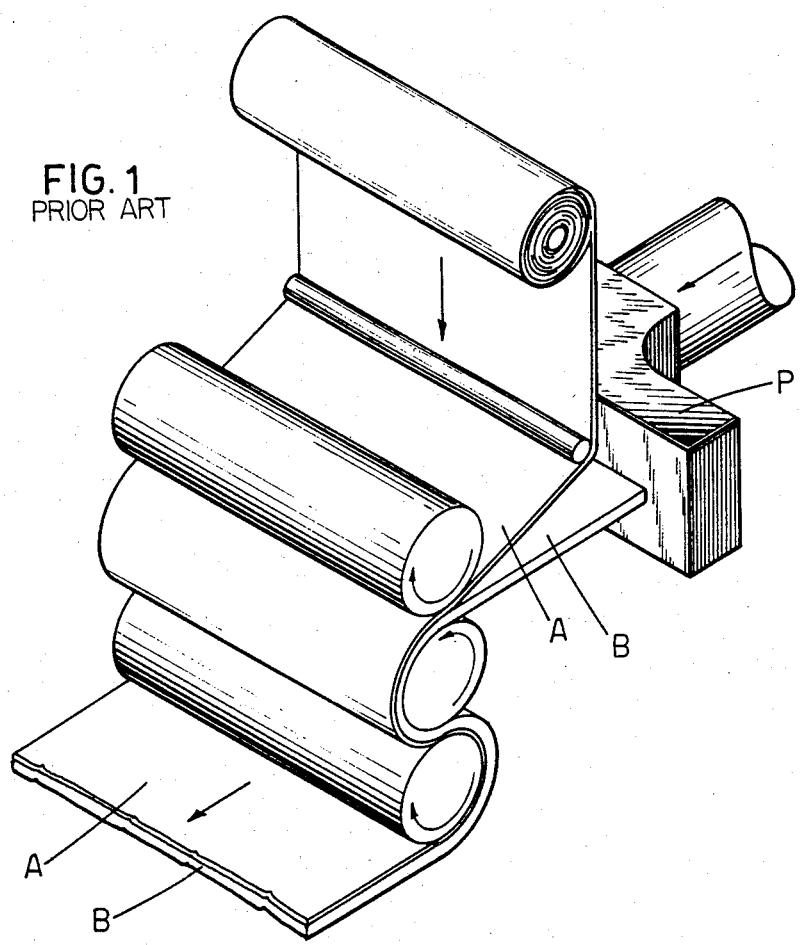
FIG. 1 shows an overall view of the apparatus for applying the protective film against a solid sheet by pressure, according to the prior art.
Figure 2:
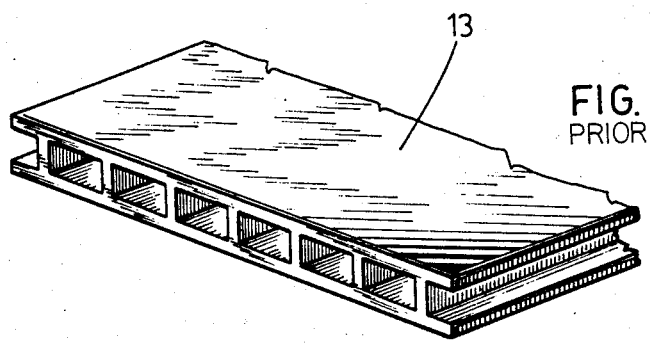
FIG. 2 shows a view of the honeycombed sheet, to which the protective film is to be applied using the apparatus according to the invention.

Said process and apparatus are particularly suited to a honeycombed sheet 13, an example of which is shown in FIG. 2.

Figure 3:
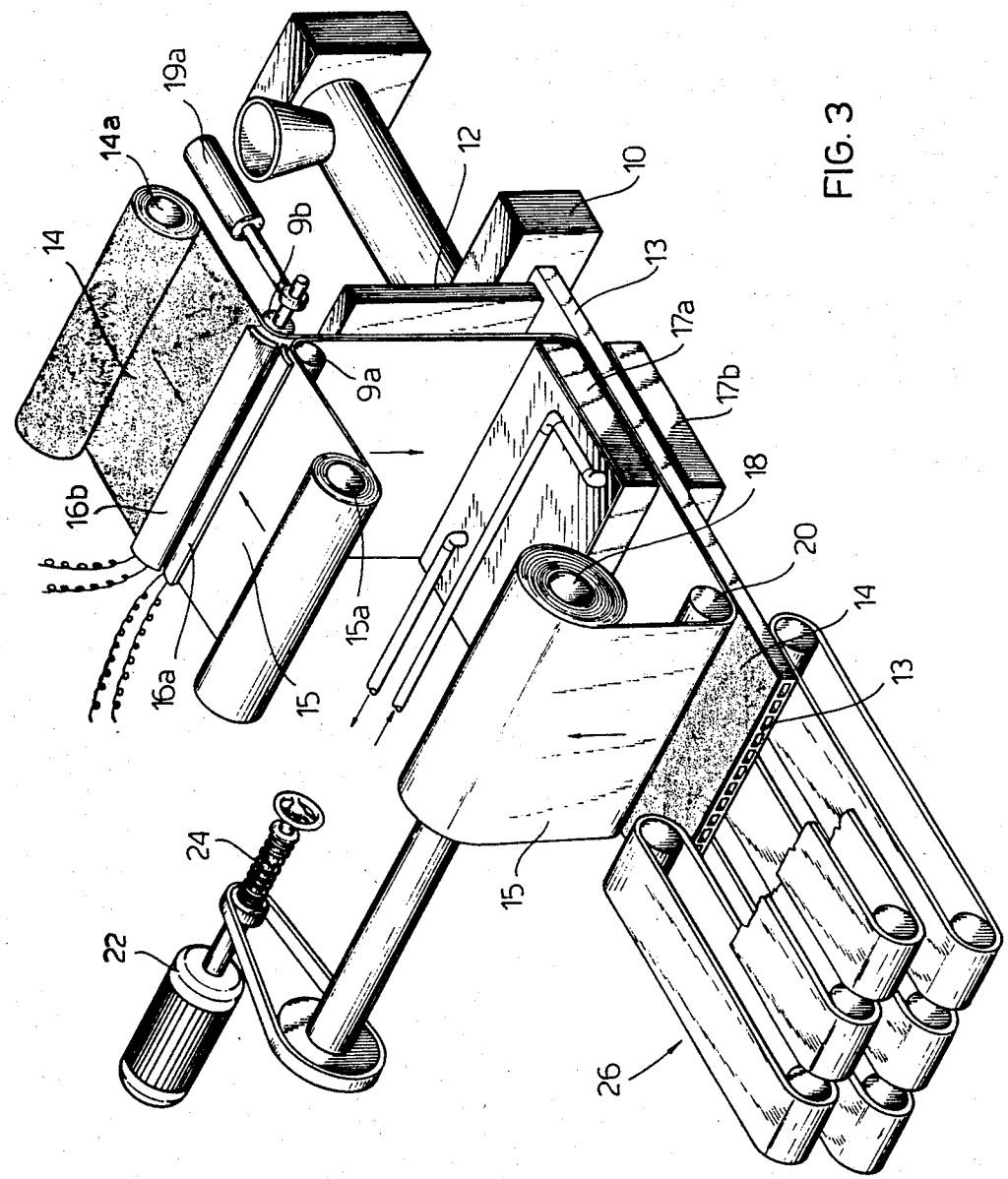
FIG. 3 shows an overall view of the apparatus according to the invention.

The apparatus for carrying out said process is shown basically in FIG. 3. It comprises an extrusion die box 10, from which the honeycombed sheet 13 comes out in a viscous state, ready to be calibrated. The cooling screen 12 is placed between the die box and the protective film 14 to be joined to it, so as to prevent the heat radiation from the metallic surfaces thereof from softening the protective film too soon. The protective film to be joined to 14 is wound on a reel 14a, fixed to a suitable mounting. The auxiliary or support film 15 is mounted on the same mounting and is wound on reel 15a.

The two films 14 and 15 are hot joined together and under light pressure from the rollers 9a and 9b. Roller 9b is rubber-coated. The resistors 16a and 16b consisting, for example, of quartz or ceramic heating bodies, are arranged in line with the portions of the two films 14 and 15, which are to be joined together by the rollers 9a and 9b. Said resistors serve to irradiate the surfaces of the two films which are meant to come into contact. The pressure of the two rollers is regulated at both ends by pneumatic pistons. In FIG. 3 only piston 19a is shown. By suitably regulating the resistor temperature and pressure of the rollers 9a and 9b on the two films, any trapping of air between the two films 14 and 15 is eliminated and they are prepared for an even laying.

The films 14 and 15 may be obtained by extrusion/blowing in tubular shape, coextrusion/blowing in tubular shape, extrusion/drawing in a flat leaf, coextrusion/drawing in a flat leaf or calendering.

Finally, the two films together are made to pass under the upper calibrating plate 17a in direct contact with the sheet to be protected and over the lower calibrating plate 17b (plate 17a has channels for a heat exchange liquid). The distance between the two plates is adjusted so that, as the combined sheet, protective film and support film pass therethrough, the end product acquires the desired commercial thickness. In order to avoid air being trapped between the films and the sheet in the plastic state, the distance between the calibrating plates is made equal to or slightly less than the clearance from the die box, in such a way as to create a small angle of incidence which prevents the trapping of air bubbles.

Gear motors, suitable clutch couplings, counteracting rollers and cutting knives for required widths are to be found in the mounting.

There is also a winding roller 18 with guide roller 20 which allows the support film 15 to be rewound, after the combination formed by the sheet 13 and the protective film 14, now in the solid state, has left the calibrating device.

A motor 22 with a clutch, adjustable for example by means of a spring 24, acts on the roller 18. The maximum tractive force is about 0.3 Kg/linear cm on the winding roller 18.

Finally, the traction device is made up of pairs of counteracting rollers or belts 26, which act on the sheet 14.

Said traction device is that normally used in the production of unprotected sheets. It can be seen in the embodiment shown in FIG. 3 that said traction device alone draws both the sheet, protective film and support film, making unnecessary any further traction devices for the films. Consequently, there is no need for a device to synchronize the moving of the films in relation to the sheet.

The temperatures reached in the combination depend on the type of material of which the sheet, protective film and support film are made. Below the types of material and temperatures for a preferred embodiment are indicated.

At present honeycombed sheets are preferably made of polycarbonate resin or polyester. They come out of a die box at 270°±5° C.

Mixes with an acrylic resin base containing antishock modifiers or other more specific polymers with a different constituent base, or a combination with several layers of the said film may be used for the protective film. These mixes contain UV absorbers of a suitable filter band, antioxidants and antistatic agents in suitable dosages. For example, antishock polymethyl methacrylate or polethyl methacrylate may be used. Preferably this protective film has a thickness of 10–20 μm and a temperature in the molten state of 140°–180° C.

Fluoridated resins or polyester may be used for the support film. For example, Teflon, Tedlar and Mylar (trademarks registered by Dupont), Melinex (ICI trademark) or Hostaphan (Hoechst trademark). Preferably this support film is 75–125 μm thick and has a temperature in the molten state of 260° C.

The die box is usually maintained at a temperature between 270° and 290° C. It should therefore be noted that the protective film has a softening temperature far lower than that of the material forming the sheet, whereas the support film has a temperature comparable to that of said material.

Heating for joining together the two films is provided by the resistors 16a and 16b at a temperature around 120° C. The maximum pressure of the roller 9b is about 0.5 Kg/linear cm and is obtained by compressing the rubber.

For an output capacity from the die box equal to 250–350 Kg/h the calibrating plates 17a and 17b have, respectively, a temperature of 105° C. (the upper one 17a) and 90° C. (the lower one 17b). The sheet is made to advance at a speed between 0.01 and 0.05 m/s as a function of the desired commercial thickness.

Using the process and apparatus which are the subject of this invention, it is possible to make a new type of more resistant end product; for example, in the case of sheets made of polycarbonate resin exposed to the harmful effects of the weather (direct solar radiation and atmospheric corrosion) both discolouring and embrittlement by hail are resisted, thereby extending their potential market.

Honeycombed sheets in polypropylene can also be improved by using the same process and apparatus.

What I claim is:

1. A process according to which a cellular sheet of plastic is extruded from an extruding means and then at least one protective film of plastic is joined to at least one of its surface layers, said protective film having a softening temperature lower than that necessary for extruding the sheet, wherein the protective film and a support film are heated and pressed together so as to form a bonded layer, then this bonded layer is laid on the surface of the cellular sheet emerging from the extruding means, with the protective film in contact with the cellular sheet, cooling the combination of cellular sheet, protective film and support film, and removing said support film from the cooled combination leaving the extruded sheet now integral with the protective film.

2. A process according to claim 1, wherein the support film is made of fluoridated resin or polyester.

3. A process according to claim 1, wherein said support film has a softening temperature around 260° C. and is about 100 um thick.

4. An apparatus for carrying out the joining of a protective film to an extruded cellular sheet, comprising a die box for extruding the sheet, means for guiding the protective film and a support film, resistors and rollers for heating and pressing together the protective film and the support film so as to form a bonded layer, means for applying this bonded layer to the extruded cellular sheet, with the protective film in contact with the cellular sheet, means for guiding and pulling the bonded layer and the extruded cellular sheet while passing through a cooling-calibrating means, and at least one means for detaching and rewinding the support film, after the application of the protective film to the cellular sheet has been accomplished.

5. An apparatus according to claim 4, further comprising a cooling screen, placed between the die box and the protective film to be joined to the cellular sheet, so as to prevent heat radiation coming from the die box from excessively softening the protective film.

6. An apparatus according to claim 4, comprising a traction device acting on the sheet emerging from the cooling-calibrating device, the rewinding means of the support film being actuated by means of an adjustable clutch device.

7. An apparatus according to claim 4, comprising at least one roller about which said support film is drawn, the last-named roller being disposed where the support film separates from the cellular sheet and protective film.

* * * * *